W. GROAT.
Car-Axle Box.
No. 7,426.
Patented June 11, 1850.
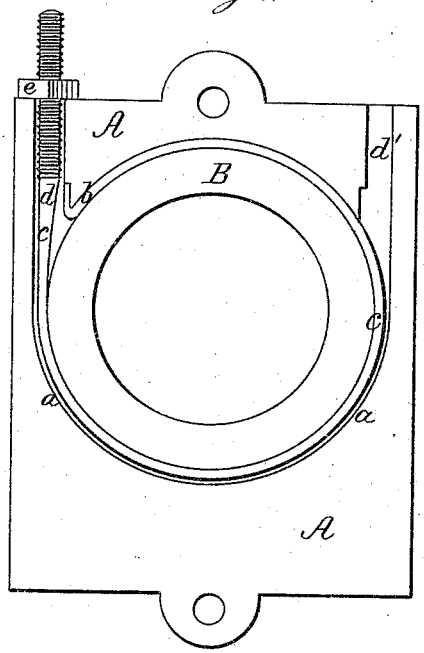
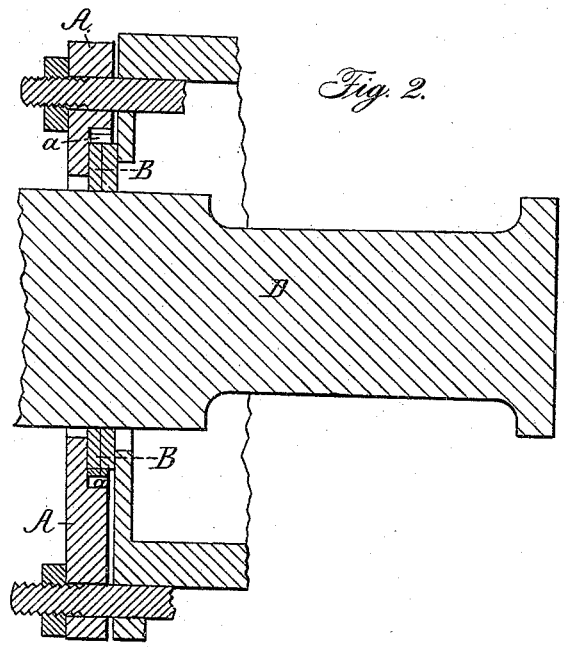

UNITED STATES PATENT OFFICE.

WARNER GROAT, OF TROY, NEW YORK.

ADJUSTING PACKING FOR OIL-BOXES OF AXLES, &c.

Specification of Letters Patent No. 7,426, dated June 11, 1850.

*To all whom it may concern:*

Be it known that I, WARNER GROAT, of Troy, in the county of Rensselaer and State of New York, have invented a new and useful Mode of Making and Retaining Railroad-Car and other Journal-Boxes Oil-Tight; and I do hereby declare that the following is a full, clear, and exact description of the construction of the same, reference being had to the annexed drawings, which make a part of this specification, in which—

Figure 1, is a view of the inside plate of the box through which the journal passes to which my improvement is attached, and Fig. 2, a vertical cross section through the center of the same, representing its connection with the box and journal therein.

The same letters have reference to like parts in both figures.

The ordinary mode heretofore employed of rendering boxes for journals oil-tight is the employment of leather bands around the journal in a similar manner which I adopt without any mode of binding it to the journal as it becomes worn; therefore when it is worn to that stage that it admits the escape of oil, it must in order to prevent such escape be removed and replaced by new packing, which causes much labor and expense from causes obvious in having to remove the boxes, &c.

In my improvement I employ a metallic band surrounding the packing so that it shall be adjustable by a nut and screw (or any other convenient mode,) from the upper side of the box, so that when the packing wears away it may be pressed to the journal and rendered oil tight until the packing is worn out, thereby saving much labor and expense in consequence of the necessary frequent renewal of the packing and preventing great waste of oil.

The description is as follows: In the inside plate A, I form a recess $a$, in which the leather (or any other suitable) packing B, is placed, which is surrounded by an iron band $c$, secured at one end to the plate by a hook $b$, and the other end which has a screw thread formed upon it passes beyond the upper edge of the plate through the recess $d$, and is drawn to any desirable tightness by the nut $e$. Thus it may be readily seen that as the packing wears it may readily be adjusted to the journal D, by drawing upon the band as described; a second recess $d'$ is formed in the plate so as to place the nut and screw on either side of the box, as it may be found the most readily of access in the convenience of adjustment.

Having thus described the nature of my invention what I claim is new and desire to secure by Letters Patent is—

The employment of an adjustable band surrounding the oil packing of railroad car or other journals, so as to admit of adjustment from the outside of the box, in adjusting the packing around the journal, and render the box oil tight in the manner and for the purpose, substantially the same as herein described and represented.

WARNER GROAT.

Witnesses:
E. L. BRUNDAGE,
E. BELL.